US011250520B2

(12) United States Patent
Drangmeister et al.

(10) Patent No.: US 11,250,520 B2
(45) Date of Patent: Feb. 15, 2022

(54) METHODS AND SYSTEMS FOR EFFICIENT DELIVERY OF ACCOUNTING AND CORPORATE PLANNING SERVICES

(71) Applicant: FIN BOX TECHNOLOGIES, Inc., Albuquerque, NM (US)

(72) Inventors: Walter Drangmeister, Albuquerque, NM (US); R. Blake Ridgeway, Albuquerque, NM (US); Karen G. Stock, Albuquerque, NM (US); Charles J. Call, Albuquerque, NM (US)

(73) Assignee: FIN BOX TECHNOLOGIES, Inc., Albuquerque, NM (US)

( * ) Notice: Subject to any disclaimer, the term of this patent is extended or adjusted under 35 U.S.C. 154(b) by 0 days.

(21) Appl. No.: 16/927,951

(22) Filed: Jul. 13, 2020

(65) Prior Publication Data

US 2020/0342544 A1    Oct. 29, 2020

Related U.S. Application Data

(63) Continuation of application No. 16/018,070, filed on Jun. 26, 2018, now Pat. No. 10,803,533.

(60) Provisional application No. 62/670,873, filed on May 14, 2018, provisional application No. 62/525,200, filed on Jun. 27, 2017.

(51) Int. Cl.
*G06Q 40/00* (2012.01)
*G06Q 10/06* (2012.01)
*G06N 20/00* (2019.01)

(52) U.S. Cl.
CPC ........... *G06Q 40/125* (2013.12); *G06N 20/00* (2019.01); *G06Q 10/0637* (2013.01)

(58) Field of Classification Search
CPC ... G06Q 40/125; G06Q 10/0637; G06N 20/00
See application file for complete search history.

(56) References Cited

U.S. PATENT DOCUMENTS

| | | | |
|---|---|---|---|
| 6,343,275 B1 * | 1/2002 | Wong ................. | G06Q 30/0201 705/26.1 |
| 7,778,895 B1 * | 8/2010 | Baxter .................. | G06Q 40/10 705/31 |
| 8,271,326 B1 * | 9/2012 | Brunet ............... | G06Q 30/0214 705/14.16 |

(Continued)

OTHER PUBLICATIONS

Altmeyer, Maximilian, Pascal Lessel, and Antonio Kruger. "Expense Control: A Gamified, Semi-Automated, Crowd-Based Approach For Receipt Capturing." Proceedings of the 21st International Conference on Intelligent User Interfaces. ACM, 2016. 31-42. Web. (Year: 2016).*

(Continued)

*Primary Examiner* — Ashford S Hayles
(74) *Attorney, Agent, or Firm* — ipTekk, LLC; Anand S. Chellappa

(57) ABSTRACT

Methods and systems for providing accounting services and corporate strategic planning services that comprise processing and aggregating financial transaction data and a plurality of input variables for maintaining a subscriber's general ledger, outputting audit ready financial reports, providing strategic planning inputs and by using at least one of semi-automated and machine learning algorithms are disclosed.

35 Claims, 13 Drawing Sheets

(56) References Cited

U.S. PATENT DOCUMENTS

Figure 1:
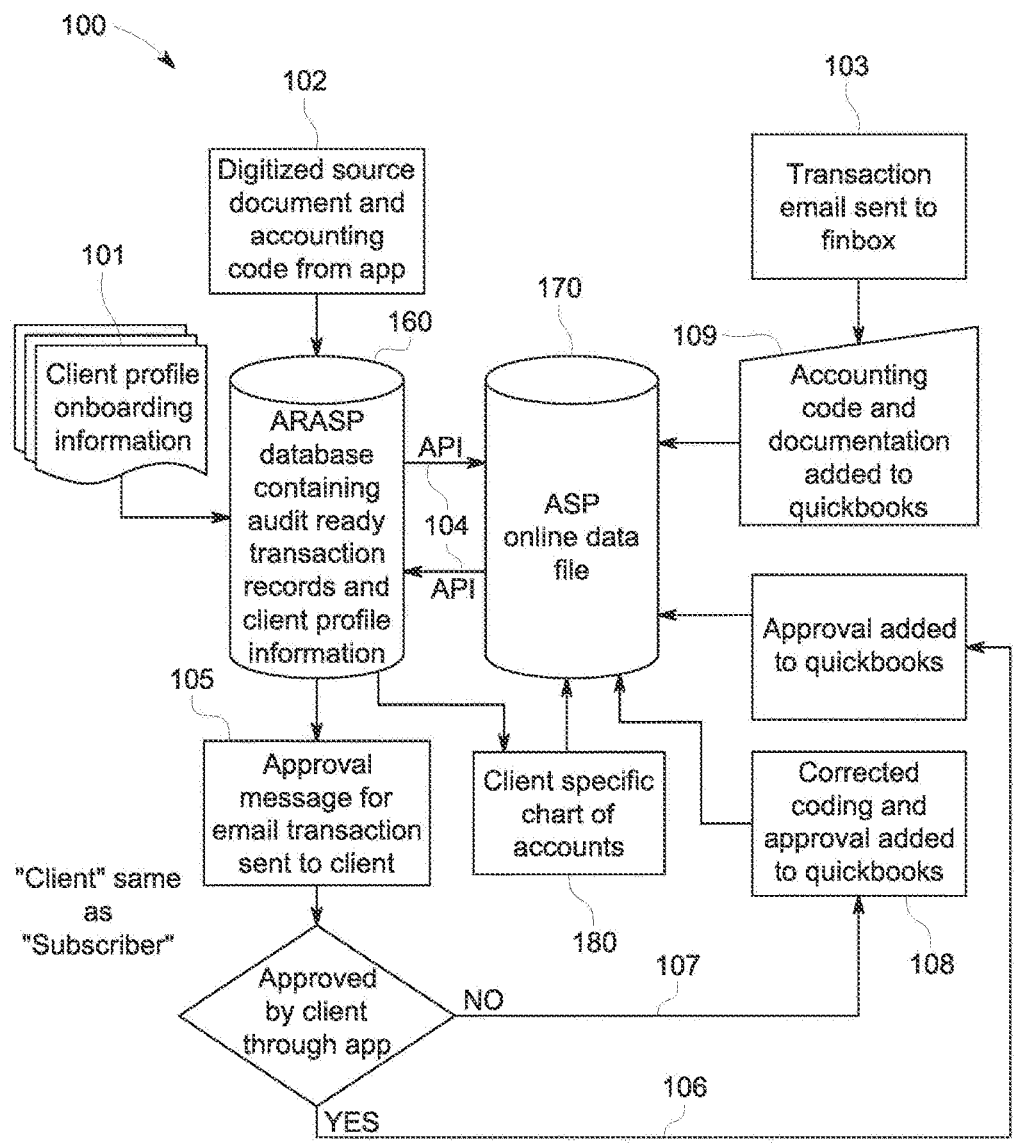

| | | | | |
|---|---|---|---|---|
| 9,009,070 B2* | 4/2015 | Young | G06Q 40/02 | 705/24 |
| 9,208,528 B2* | 12/2015 | Chelst | G06Q 40/12 | |
| 10,140,665 B1* | 11/2018 | Lipstein | G06Q 40/12 | |
| 2002/0156733 A1* | 10/2002 | Shimada | G06Q 20/108 | 705/42 |
| 2003/0144932 A1* | 7/2003 | Martin | G06Q 40/02 | 705/32 |
| 2003/0225638 A1* | 12/2003 | Secola | G06Q 40/12 | 705/30 |
| 2003/0225692 A1* | 12/2003 | Bosch | G06Q 20/108 | 705/42 |
| 2004/0064340 A1* | 4/2004 | Johnston | G06Q 50/18 | 705/311 |
| 2004/0088313 A1* | 5/2004 | Torres | G06F 16/93 | |
| 2004/0199445 A1* | 10/2004 | Eder | G06Q 10/06375 | 705/35 |
| 2005/0044015 A1* | 2/2005 | Bracken | G06Q 40/00 | 705/30 |
| 2005/0097014 A1* | 5/2005 | Ebert | G06Q 40/12 | 705/30 |
| 2005/0144096 A1* | 6/2005 | Caramanna, II | G06Q 40/12 | 705/30 |
| 2005/0289025 A1* | 12/2005 | Fredericks | G06Q 10/10 | 705/30 |
| 2006/0106688 A1* | 5/2006 | Greenaae | G06Q 40/02 | 705/30 |
| 2007/0094088 A1* | 4/2007 | Mastie | G06Q 20/203 | 705/24 |
| 2011/0238430 A1* | 9/2011 | Sikorski | G06Q 10/10 | 705/1.1 |
| 2012/0047052 A1* | 2/2012 | Patel | G06Q 40/00 | 705/30 |
| 2012/0259748 A1* | 10/2012 | Young | G06Q 40/02 | 705/34 |
| 2013/0036073 A1* | 2/2013 | Kiger | G06Q 40/06 | 705/36 R |
| 2013/0054431 A1* | 2/2013 | Forman | G06Q 50/26 | 705/30 |
| 2013/0226750 A1* | 8/2013 | Friedholm | G06Q 10/1057 | 705/34 |
| 2013/0232043 A1* | 9/2013 | Patel | G06Q 40/10 | 705/34 |
| 2013/0297700 A1* | 11/2013 | Hayton | G06Q 10/10 | 709/204 |
| 2014/0067568 A1* | 3/2014 | Argue | G06Q 20/047 | 705/21 |
| 2014/0101062 A1* | 4/2014 | Beigel | G06Q 30/018 | 705/317 |
| 2014/0156806 A1* | 6/2014 | Karpistsenko | H04L 29/06027 | 709/219 |
| 2014/0188673 A1* | 7/2014 | Graham | G06Q 40/10 | 705/30 |
| 2014/0358745 A1* | 12/2014 | Lunan | G06Q 40/12 | 705/30 |
| 2015/0012399 A1* | 1/2015 | Ceribelli | G06Q 30/04 | 705/34 |
| 2015/0026021 A1* | 1/2015 | Khan | G06Q 10/1091 | 705/30 |
| 2015/0058092 A1* | 2/2015 | Rea | G06Q 30/0639 | 705/7.38 |
| 2015/0324930 A1* | 11/2015 | Abernethy | G06Q 40/12 | 705/30 |
| 2015/0332277 A1* | 11/2015 | Bhosale | G06Q 30/018 | 705/317 |
| 2016/0042469 A1* | 2/2016 | Lochrie | G06F 16/3344 | 705/30 |
| 2016/0104252 A1* | 4/2016 | Simpson | G06Q 40/128 | 705/33 |
| 2016/0125511 A1* | 5/2016 | Shaaban | G06Q 30/0623 | 705/26.81 |
| 2016/0321673 A1* | 11/2016 | Kallman | G06Q 30/01 | |
| 2017/0353477 A1* | 12/2017 | Faigon | H04L 63/1416 | |
| 2018/0012268 A1* | 1/2018 | Simantov | G06Q 30/04 | |
| 2018/0025340 A1* | 1/2018 | Schlosser | G06Q 20/227 | 705/24 |
| 2018/0040064 A1* | 2/2018 | Grigg | G06N 5/022 | |
| 2019/0392410 A1* | 12/2019 | Ceribelli | G06Q 20/042 | |

OTHER PUBLICATIONS

Perols, Johan. "Financial Statement Fraud Detection: An Analysis of Statistical and Machine Learning Algorithms." Auditing: a journal of practice and theory 30.2 (2011): 19-50. Web. (Year: 2011).*

* cited by examiner

| Onboarding |
| --- |
| |
| Founder/Key Contact Information |
| Name |
| Address |
| Social Security Number |
| Cell Phone Number |
| Other Phone Number |
| Business email address |
| Other email address |
| Other email address |
| |
| Corporation |
| Articles of Formation or Articles of Organization |
| Organizational Minutes and Bylaws |
| Shareholder Agreement |
| Share Certificate or Accounting |
| |
| Limited Liability Company (LLC) |
| Articles of Formation or Articles of Organization |
| Operating Agreement |
| Member Certificate or Accounting |
| |
| Partnership |
| Partnership Agreement |
| |
| Taxation and Related Registration Numbers |
| Federal Employer Identification Number (EIN) |
| New Mexico CRS-1 Number |
| New Mexico UI Number (Unemployment Insurance) |
| State Certificate of Organization |
| |
| Financial Accounts Information |
| |
| Bank Account Information |
| Login, Password, Account Number, ID questions |
| |
| Company Credit Card Account Information |
| Login, Password, Account Number, ID questions |
| |
| Any Existing Accounting Records (online/manual) |

A

FIG. 3A

| Additional Shareholders, Members, Partners |
|---|
| Name |
| Address |
| Social Security Number |
| Cell Phone Number |
| Other email address |
| Business email address |
| other email address |
| |
| Vendors/Subcontractors |
| Vendor list setup |
|   address |
|   email address |
|   phone number |
|   contract |
| W-9 for vendors needing 1099s |

FIG. 3A Continued

Daily Processing

*Accountant Tasks*

*Bank Account*
Upload online transactions from Bank Account
Enter Invoices from Email (accounting, vendor, documentation) for Bank Account
Review Any App Transactions and Add any Exceptions to Supervisor Report
Match Transactions for Bank Account
Recode Account Number and Enter Invoices for any "Ask My Accountant" Bank Account transactions received
Match Transactions for Bank Account
Place Any "Add" Transactions for Bank Account in "Ask My Accountant" and Add to Supervisor Report
Send Bank Account Supervisor Report
Enter any customer payments received

*Credit Card Account (Not Reimburse Me Now)*
Upload online transactions from Credit Card Account
Enter Invoices from Email (accounting, vendor, documentation) for Credit Card Report
Review Any App Transactions and Add any Exceptions to Supervisor Report
Match Transactions for Credit Card Report
Recode Account Number and Enter Invoices for any "Ask My Accountant" Credit Card Account transactions received
Match Transactions for Credit Card Account
Place "Add" Transactions for Credit Card Account Older Than One Day in "Ask My Accountant" and Add to Supervisor Report
Send Credit Card Supervisor Report

} A

FIG. 3B

| Monthly Processing |
|---|
| |
| Reconcile Bank Account and Produce Reconciliation Report |
| Reconcile Credit Card Account and Produce Reconciliation Report |
| Prepare Monthly Reports per Client Profile |
| Message Client That Reports are Completed and Include Link to Reports |
| Prepare and Submit Monthly CRS-1 Report for NM Gross Receipts Tax |
| Make sure QBO send all necessary payroll tax filings/payments |

FIG. 3C

METHODS AND SYSTEMS FOR EFFICIENT DELIVERY OF ACCOUNTING AND CORPORATE PLANNING SERVICES

CROSS REFERENCE TO RELATED APPLICATIONS

This application is a Continuation of U.S. patent application Ser. No. 16/018,070 filed Jun. 26, 2018, and titled "Methods and Systems for Automated Bookkeeping and Financial Services," which is related to and claims the benefit of and priority to U.S. Provisional Application No. 62/525,200, filed Jun. 27, 2017, and titled "Methods and Systems for Automated Bookkeeping and Financial Services," and U.S. Provisional Application No. 62/670,873, filed May 14, 2018, and titled "Methods and Systems for Efficient Delivery of Accounting and Corporate Planning Services," the entire disclosures of which are hereby incorporated herein by reference in their entireties.

FIELD

The present invention relates to methods and systems for providing accounting services and corporate strategic planning services using at least one of semi-automated and machine learning algorithms.

BACKGROUND

Most startup companies and small to medium sized business enterprises (SME) struggle with financial accounting, and in particular, find it difficult to retain affordable and high-quality bookkeeping and financial management services. Most entrepreneurs resort to the "do it yourself" approach to their company's accounting. Accounting software providers ("ASP"), such as QuickBooks and Xero, provide local or cloud-based software which require the user to manually input their company's expenses, prepare invoicing, manage accounts receivable (A/R), manage employee payroll, track payments to vendors and manage accounts payable (A/P). Because the entrepreneur often has little or no formal training in accounting, expenses and or payments may be misallocated and not treated appropriately for tax purposes, financial planning and corporate strategy purposes. Managing employees, state and local taxes, investment transactions, and capital purchases are particularly problematic for most startups and many SME's. Frequent reviews by an experienced bookkeeper or certified public accountant is often needed, but not always available. A method of delivering accounting services that is both efficient, audit ready, and inexpensive is needed.

U.S. Pat. No. 9,117,208 (assigned to Xero Ltd.) describes an online accounting software that enables small business customers with the ability to manage their accounts within a cloud. Users are able to access a secure online website, review, and update their data. Customers can invite trusted advisors e.g., accountants, bookkeepers, their bank manager, and/or their business partner into their accounts. Disclosed are example systems and methods by which a financial institution that holds a business's financial data can share this financial data with an accounting software system (e.g., a hosted online accounting software solution) for the benefit of their customers, via automated provisioning. The system may include an accounting and payroll module, a community module, a billing/subscription management module, a notifications center module, a user profile management module, and an analytics module. An accountant may create and generate standardized sets of reports such as profit and loss statement and quarterly reports. The accounting and payroll module may access banking data for each client business. The banking data may be imported either through a bank feed or a user or accountant created document. The accounting and payroll module may also communicate with third-party tools via an application programming interface ("API").

U.S. Pat. Pub. No. 2012/259748 (assigned to Microsoft, Inc.) describes a mobile phone application to capture key expense information and/or associated receipts for expense reporting purposes. The expense information and/or receipts may then be sent to the employee's company expense management application, which may be part of a ERP ("Enterprise Resource Planning") service, through a mobile phone data connection. The receipts and information may be available when the employee completes his or her expense report. This helps the employee to easily capture the information on the go without needing to keep track of paper receipts or amounts paid in cash. The application provides an integrated and automated user experience, integration with a mobile device's camera or attached scanner module to capture a receipt, local storage of expense information and receipts at an offline data store, ability to send the expense information and receipts to a cloud-based ERP service using a defined interface, and authentication and/or identity protection services.

U.S. Pat. Pub. No. 2015/026021 describes a reporting system and method for collecting and processing of transactional and financial data and non-transactional data to provide an effective tool for overseeing the on-going operations of an enterprise and for integrating cash sheet management with an accounting and payroll system in a cloud-based computing network. The system receives data, processes data, communicates data, and/or provide reports in real-time. It also provides an option for inputting purchases/expenses occurring at the point of sale into the cloud-based system along with a copy of invoices/receipts, which may then be automatically posted within an accounts component or module.

Crunchbase, Inc. (Brandenburg, Germany) reports that a system called SMACC uses artificial intelligence and machine learning technology to extract relevant data from a customer's scanned invoices and receipts and to do bookkeeping automatically. Financial documents are digitized, automatically organized, and securely archived in data centers. Customers can access their documents from any device using their account credentials and may grant access to accountants, business partners, and employees. The system purports to recognize multiple data points including, payment terms, tax information, address data, and descriptions and amounts of products and services invoiced on bills and receipts. The information is reported to be used to automatically start financial workflows including bill approvals, digital payments, and financial controlling. Based on the recognized invoice or collected document information, the software system can purportedly allocate financial accounts, cost centers, and project centers to every item on your bill. The system learns from inputs provided by accountants and financial accountants to ensure highest quality and accuracy. The system purports to provides for transparency and access to real-time financial data. Automated data processing provides daily insights a customer's business's financial performance. The system generates real-time reports of revenues, expenses and operational profitability. All data is directly linked to the corresponding invoices, receipts and payment transactions. All financial supplier and customer data is automatically aggregated and made available in a mobile application software ("app").

SmartVault Corp. provides an accounting documentation software that facilitates the storage of source documents across many online applications. SmartVault is primarily used by accountants who use ASP software such as Quickbooks, Xero, and Freshbooks. The software may also be used by business entities that need document management capabilities. ApprovalMax is a multi-layered accounting approval solution. It is more applicable to organizations in which multiple and often different layers of approval are required for transactions of different sizes and types. These products and many others offered by financial technology companies address one aspect or another from the ensemble of financial activities that are normally associated with the provision of accounting services, and often replace older, slower, and more manual processes with a more modern digital service. Systems and methods that comprise a user-friendly app, one or more dedicated accountants, and a robust process that allows for audit ready accounting of a wide range of transactions are required.

The systems and methods described herein allow subscribers to enter financial transactions along with supporting documentation in substantially real-time relative to the occurrence of a business event or expense. The app is preferably linked to an ASP software such as QuickBooks via an API. In addition, provided is an e-mail processing feature that allows subscribers to forward e-mail receipts and invoices to an audit ready accounting service provider ("ARASP"), which are then recorded and documented by accountants. Audit-ready financial data may then be aggregated with sales, R&D roadmap, product roadmap, market data and may be used to assist with the subscriber's corporate strategic planning initiatives.

In this disclosure, "real-time" generally means "the actual time during which a process or event occurs or virtually immediately as a process or event occurs." Further, "audit readiness" links business activities to accounting transactions and ensures that the accounting transactions are properly reported in the financial records with required supporting documentation. Audit readiness improves the quality of financial information, leading to better data for decision-making.

BRIEF DISCLOSURE

In one disclosed aspect, a method for providing accounting services by an accounting service provider to a subscriber may comprise the steps of providing a first accounting application software configured to communicate with a first database for storing transactional data, providing a second accounting application software configured to communicate with a second database for storing transactional data, setting up a subscriber corporate profile account using the first accounting software and the second accounting software, wherein the corporate account comprises a plurality of authorized user accounts, inputting transactional data to at least one of a user account and corporate account using at least one of the first accounting software and second accounting software after assigning and accounting code related to the transaction, processing data using at least one of monthly processing and daily processing steps, synchronizing the first and second databases at predetermined intervals using an API provided by the first software for bidirectional secure communication between the databases, generating requests for authorization related to at least one of an authorized user transaction and corporate transaction using the first accounting software wherein requests authorized by a supervisor are added to the second database and requests not authorized are routed back for corrective coding, and recording transactional data in a general ledger of the subscriber stored in the first database by the first accounting software. The first software may comprise a mobile application program configured to run on a smart device assigned to a user. User access to the first software using a smart device may be secured by an alphanumeric passcode. User access to the first software using a smart device may be secured by push authentication. The second accounting software may comprise of at least one of QuickBooks Online, Freshbooks, and Xero.

Transactional data may comprise at least one of invoices attached to e-mails related to corporate expenses and received into a subscriber corporate e-mail account, receipts related to user expenses and received into a user e-mail account associated with a subscriber account, expense information captured by a user using a camera of a smart device to provide a digitized source document, transactional information generated by each user associated with a subscriber and transmitted by at least one of credit/debit card magstripe readers and point of sale contactless readers in the form of at least one of an e-mail directed to a user e-mail account and directly to a subscriber's credit card account or bank account, Credit/debit card statements associated with each user credit card associated with a subscriber, and, bank statements associated with each subscriber account. The inputting step may comprise inputting data received in the form of e-mails by a bookkeeper retained by the service provider into the second software. The inputting step may comprise inputting data received in the form of e-mails by an accountant retained by the service provider into the second software. The inputting step may comprise inputting data received in the form a digitized source document by a user into the first software. The inputting step may comprise inputting data received in the form at least one of a digitized source document and e-mails by machine learning algorithms incorporated in the first software.

The monthly processing step may comprise at least one of reconciling subscriber bank account and producing a bank account reconciliation report, reconciling subscriber credit card account and producing credit card account reconciliation report, synchronizing first and second databases, preparing monthly reports comprising at least of P&L statement and cash flow statements, messaging subscriber that reports are completed and providing a link to said reports; and, preparing monthly tax payment statements.

The daily processing step may comprise at least one of uploading online transactions from at least one of subscriber's bank account and credit card account, entering invoices from e-mails, reviewing any transactions input using the first software and adding any exceptions in a report to the supervisor, matching at least one of bank account and credit card account transactions with the subscriber information in the second database, recoding account number for invoiced expenses received from at least one of subscriber bank account and credit card account, sending at least one of bank account and credit card account reports to a supervisor, entering customer payments received, preparing and distributing any invoices, and conducting supervisor tasks which may further at least one of responding to any messenger requests, sending messages to subscriber requesting documentation for one or more transactions identified in supervisor reports, approving reimbursements, sending approval messages for outgoing payments, and paying any invoices and credit card bills due. The first database may be a SQL database.

In another aspect, the method for providing accounting services may comprise an accounting master database for aggregating data from first and second databases and third-party databases. The third-party database may comprise at least one of subscriber's sales management database, patent portfolio management database, and Dun & Bradstreet database. The method of claim 15 further comprising the step of datamining the aggregated data to identify patterns related to at least one of subscriber's revenue growth, revenue targets, marketing strategies, internal management processes, and cost profiles. The method may utilize machine learning algorithms to predict and optimize at least one of subscriber's product development roadmaps, innovation roadmaps, cost control options, revenue forecasts, sales forecasts, sales strategy, pricing strategy, project execution, general accounting compliance, general accounting fraud assessment, tax strategies, and fiduciary obligation of stakeholders and officers.

In another aspect, a system for providing accounting service by an accounting service provider to a subscriber may comprise a first SQL database for storing transactional data and configured to communicate with a first accounting software, and a second SQL database for storing transactional data and configured to communicate with a second accounting software, wherein, the first software and second software are configured to setup the subscriber corporate profile account wherein the corporate account comprises a plurality of authorized user accounts, at least one of the first accounting software and second accounting software is configured to receive transactional data inputs into at least of a user account and subscriber corporate account, at least one of the first accounting software and second accounting software is configured to process data using at least one of monthly processing and daily processing steps, the first and second databases are synchronized at predetermined intervals using an API provided by the first software to provide bidirectional secure communication between the databases and, the first software records transactional data in a general ledger of the subscriber stored in the first database. Transactional data may be input in part by a bookkeeper retained by the service provider. The first software may be hosted in a smart device as a mobile application program. Transactional data may be input in part by a user using the mobile application program.

Other features and advantages of the present disclosure will be set forth, in part, in the descriptions which follow and the accompanying drawings, wherein the preferred aspects of the present disclosure are described and shown, and in part, will become apparent to those skilled in the art upon examination of the following detailed description taken in conjunction with the accompanying drawings or may be learned by practice of the present disclosure. The advantages of the present disclosure may be realized and attained by means of the instrumentalities and combinations particularly pointed out in the appendant claims.

DRAWINGS

The foregoing aspects and many of the attendant advantages of this disclosure will become more readily appreciated as the same becomes better understood by reference to the following detailed description, when taken in conjunction with the accompanying drawings, wherein:

FIG. 1. Schematic flow diagram showing an exemplary method for providing audit-ready accounting services.

FIGS. 2A, 2B, 2C, and 2D depict a front view of the home screen (or splash screen) of an exemplary app on a mobile device, front view of a menu screen of an exemplary app on a mobile device related to credit card transactions, front view of a menu screen of an exemplary app on a mobile device related to a bill, and front view of menu screen of an exemplary app on a mobile device related to message threads between the user and the one or more databases linked to the app or between the user and an accountant, respectively.

Figure 3A:
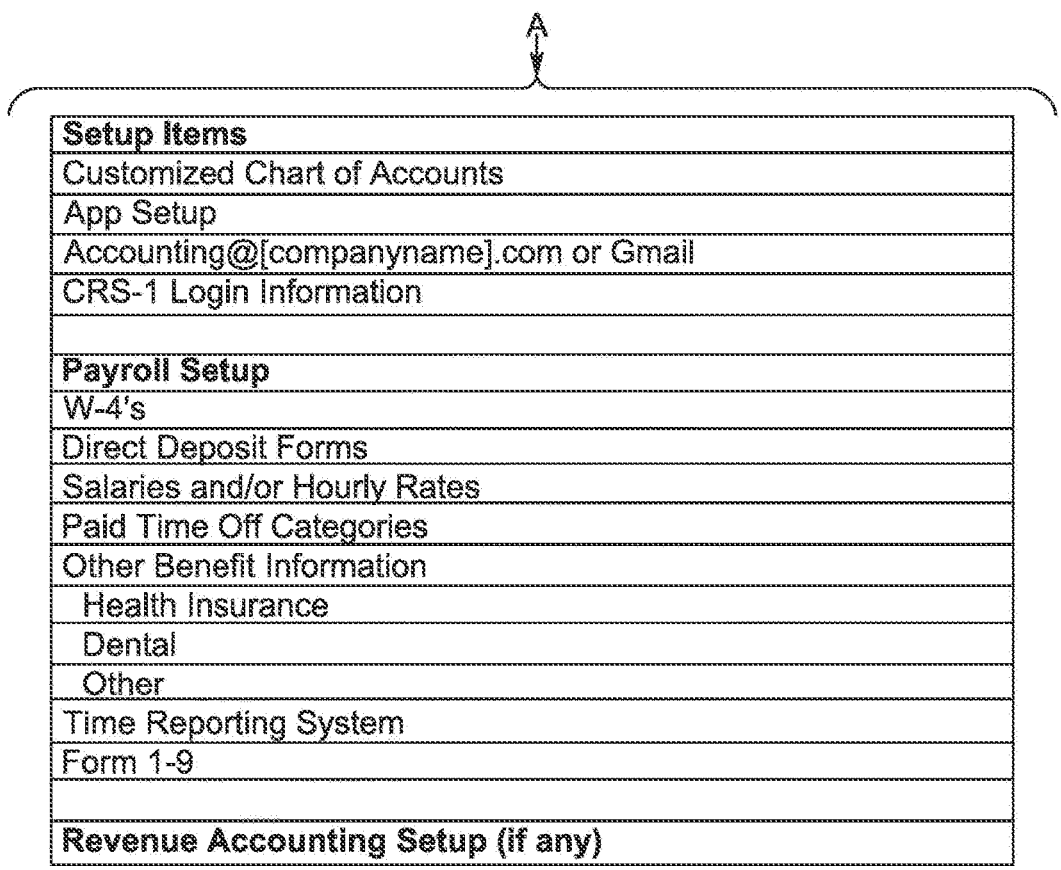
Figure 3B:
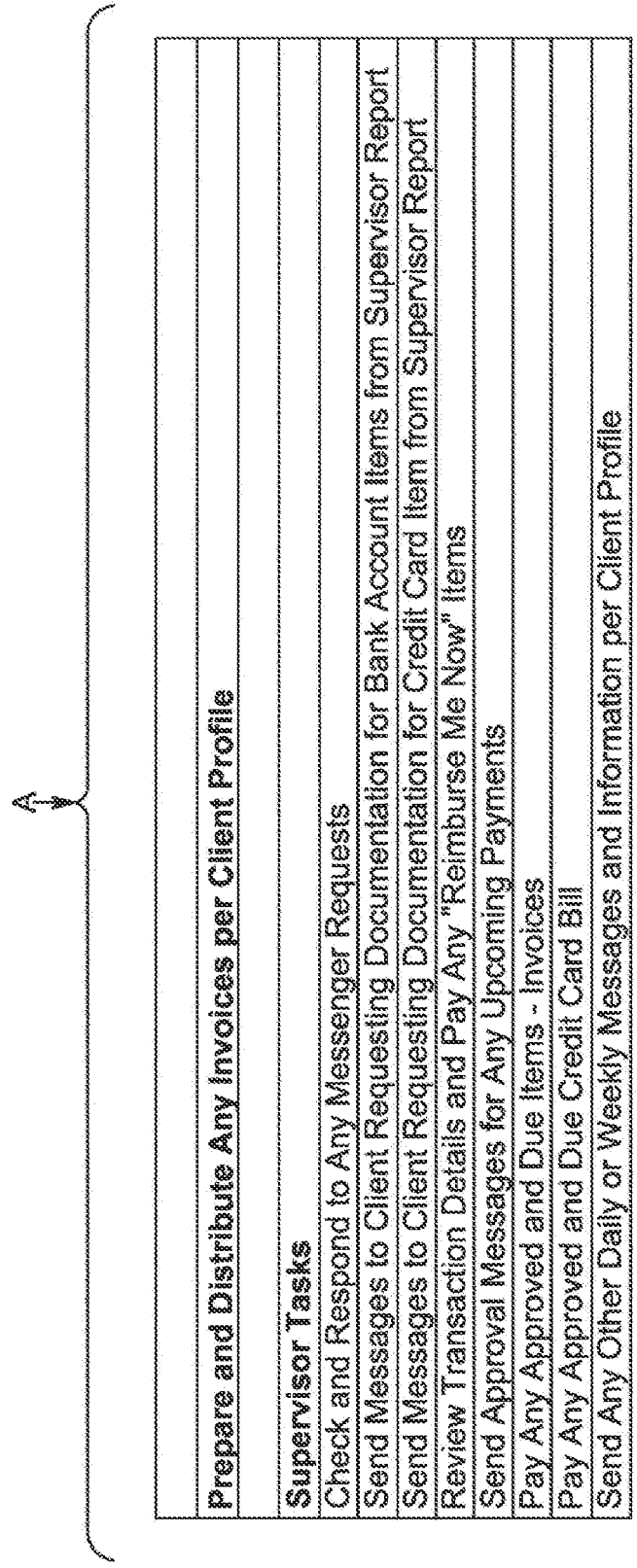

FIGS. 3A, 3B, and 3C depict a schematic diagram showing an exemplary task list related to onboarding a new subscriber and users associated with subscriber, schematic diagram showing an exemplary task list related to daily processing of financial transaction related to a user, and schematic diagram showing an exemplary task list related to monthly processing of financial transactions, respectively.

Figure 4:
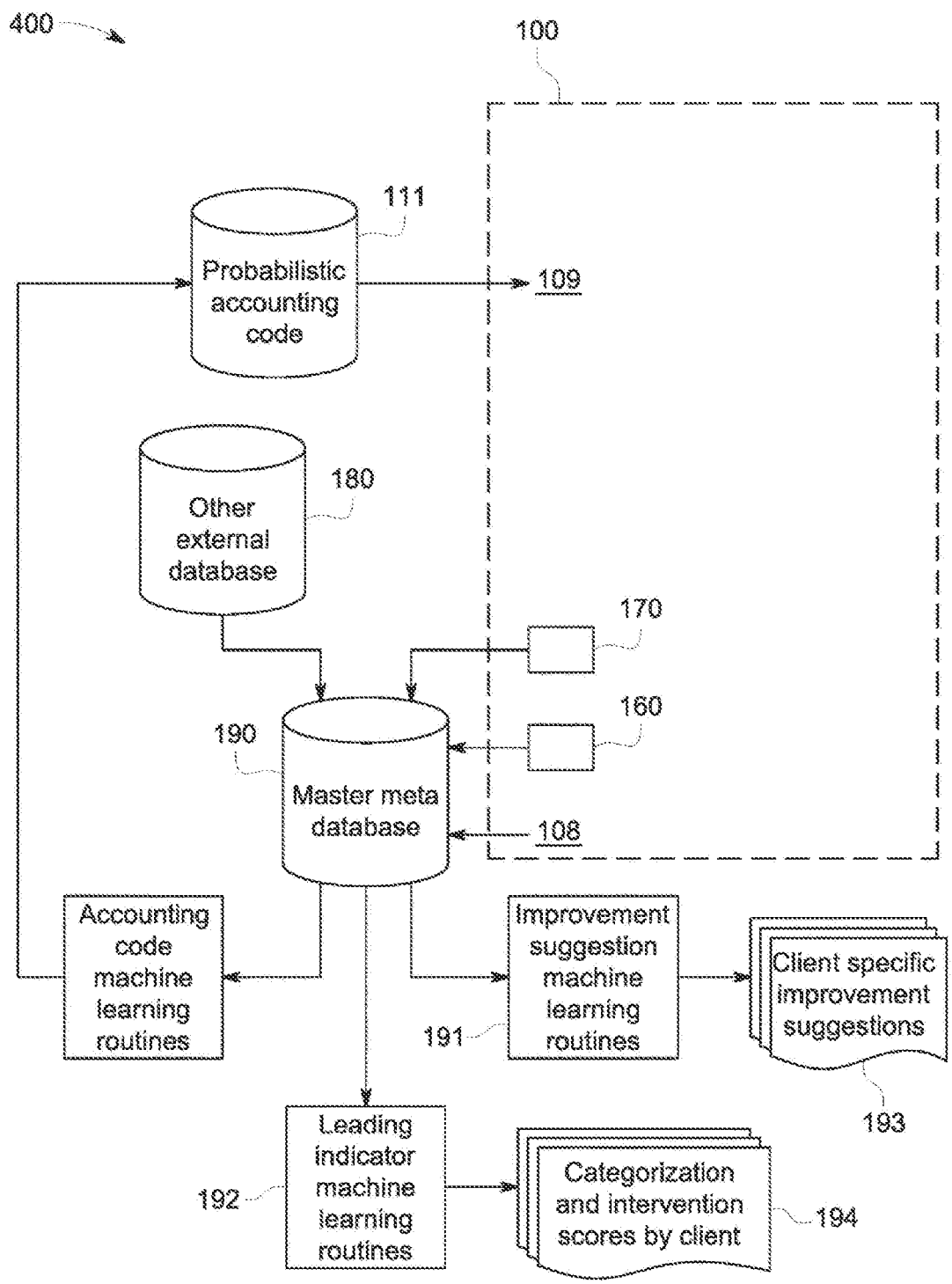

FIG. 4. Schematic flow diagram showing an exemplary method for providing outputs that relate to corporate strategy using a plurality of inputs including accounting data.

Figure 5A:
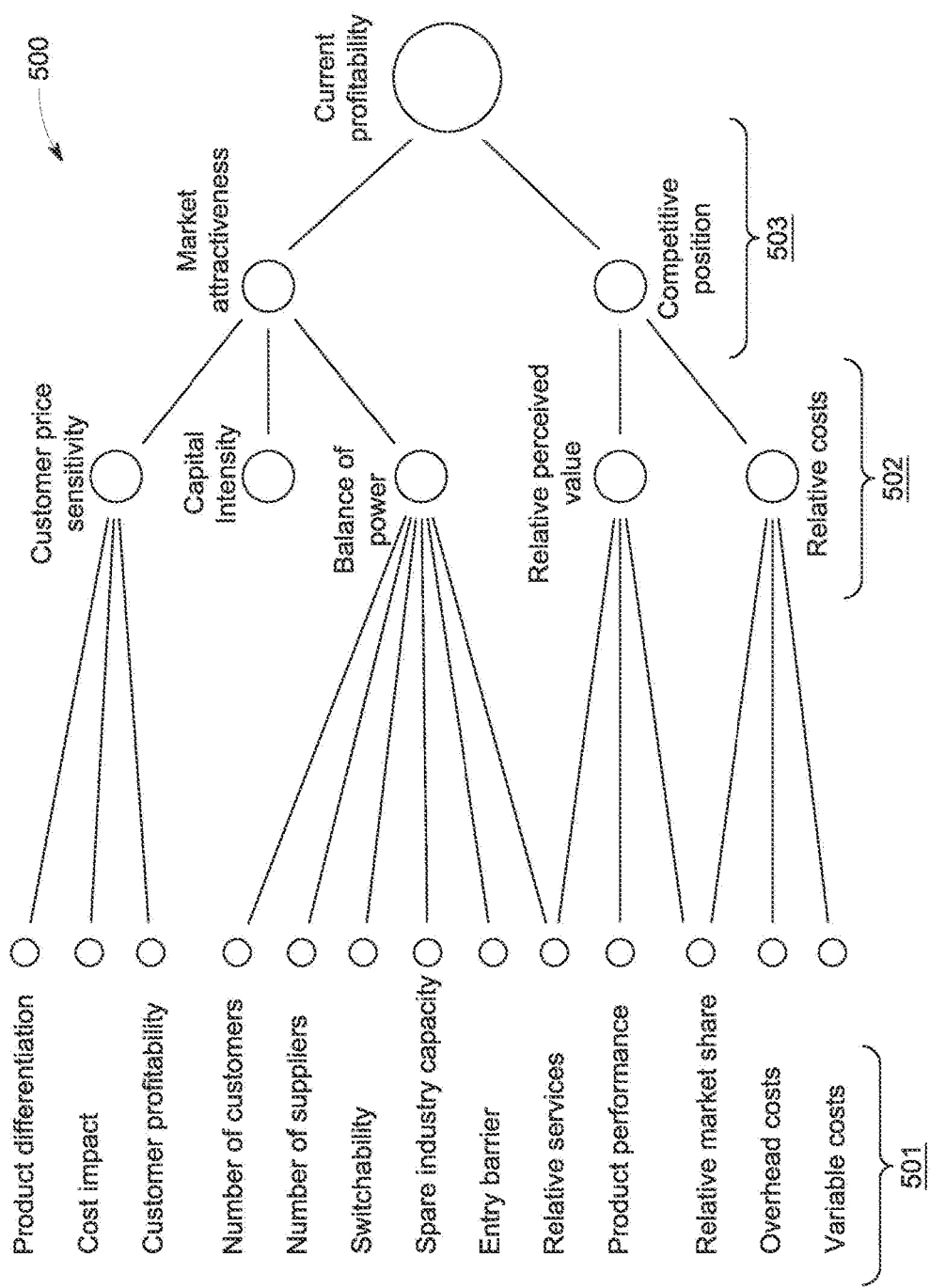
Figure 5B:
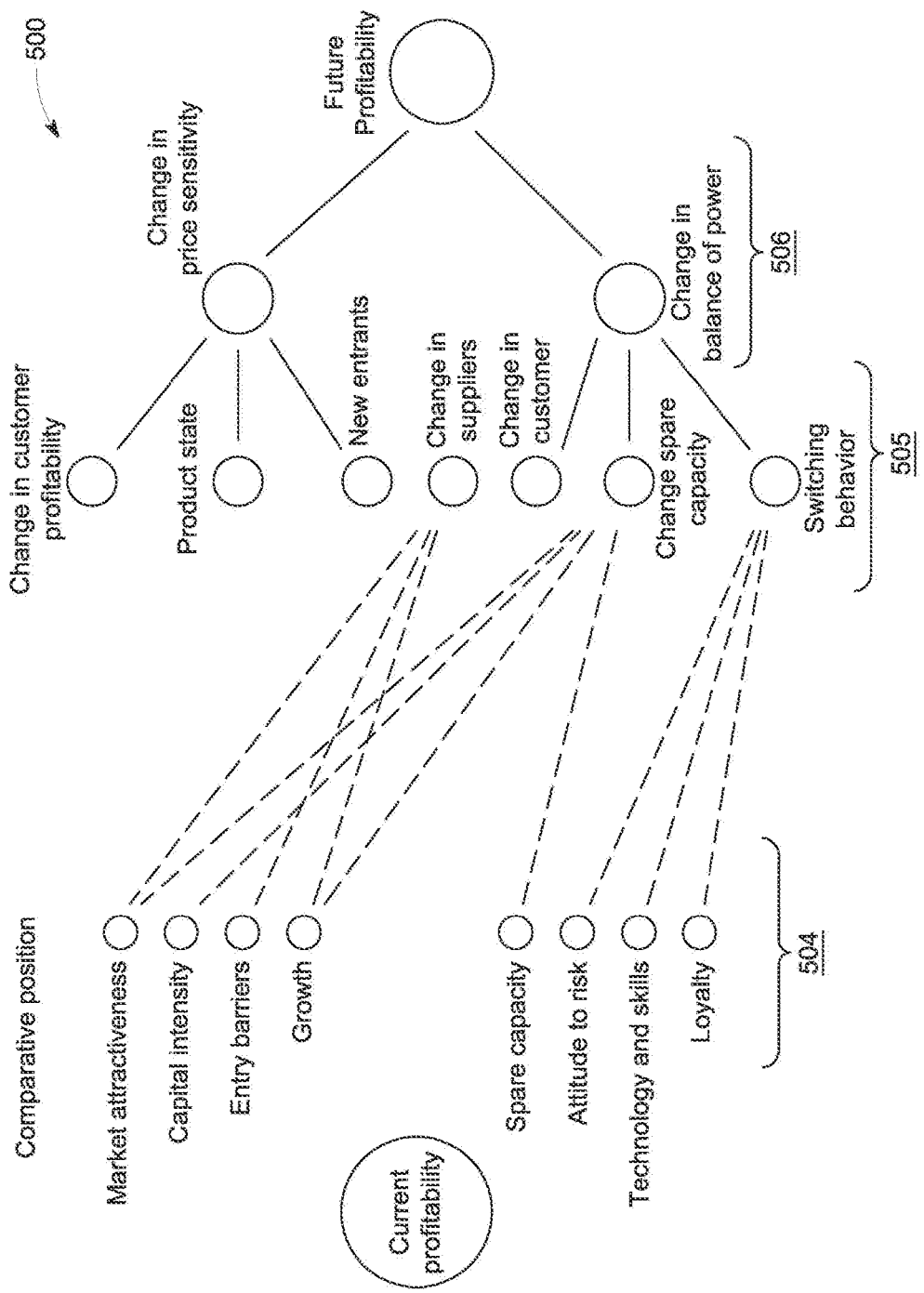

FIGS. 5A and 5B depict a schematic drawing showing a machine learning work flow related to current profitability of a subscriber, and a schematic drawing showing a machine learning work flow related to future profitability of a subscriber, respectively.

Figure 6:
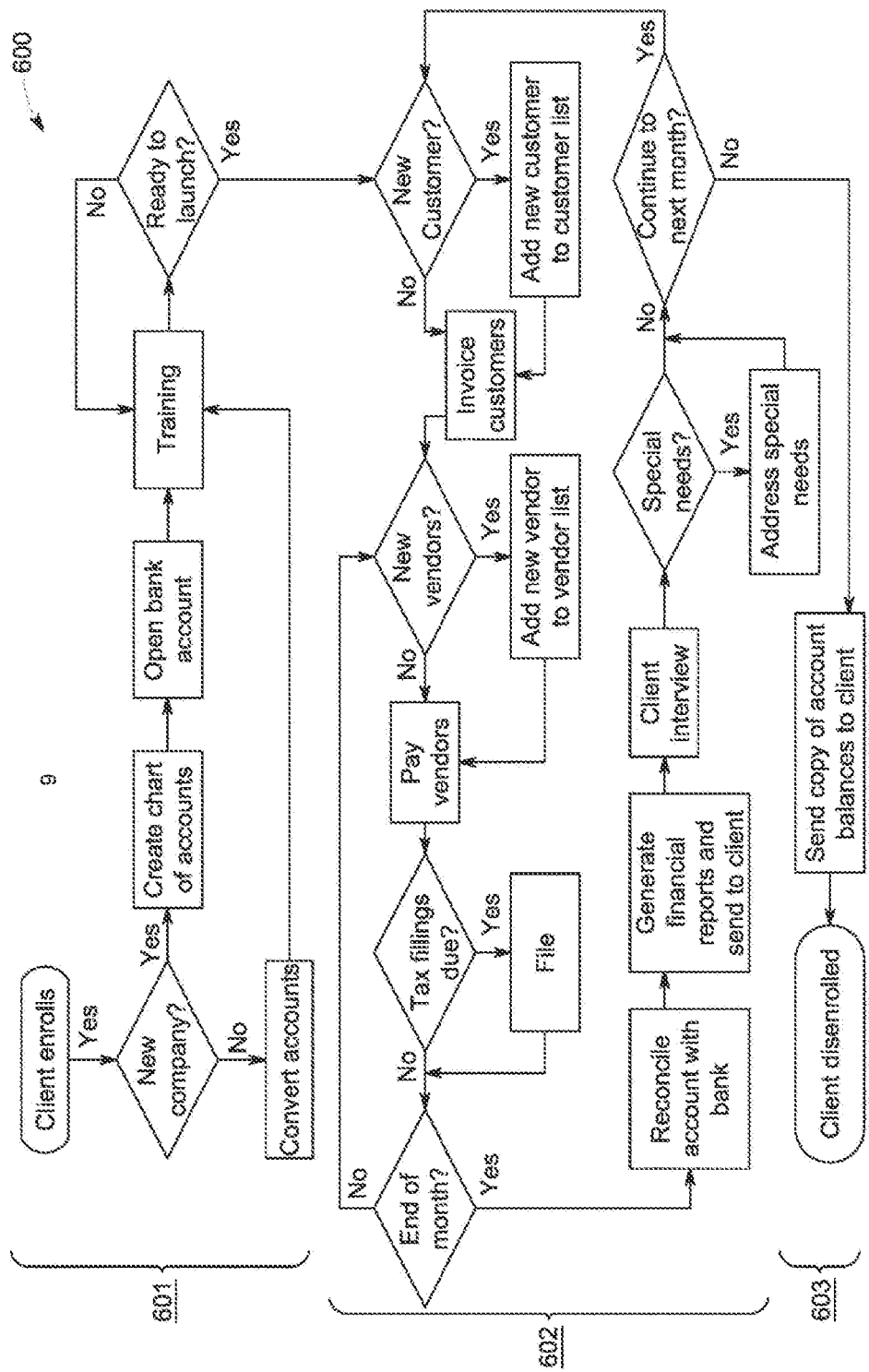

FIG. 6. Schematic drawing showing an exemplary method for providing audit-ready accounting services and "special needs" services.

All reference numerals, designators and callouts in the figures are hereby incorporated by this reference as if fully set forth herein. The failure to number an element in a figure is not intended to waive any rights. Unnumbered references may also be identified by alpha characters in the figures and appendices.

The following detailed description includes references to the accompanying drawings, which form a part of the detailed description. The drawings show, by way of illustration, specific embodiments in which the pilot assembly and methods may be practiced. These embodiments, which are to be understood as "examples" or "options," are described in enough detail to enable those skilled in the art to practice the present invention. The embodiments may be combined, other embodiments may be utilized or structural or logical changes may be made without departing from the scope of the invention. The following detailed description is, therefore, not to be taken in a limiting sense and the scope of the invention is defined by the appended claims and their legal equivalents.

In this document, the terms "a" or "an" are used to include one or more than one, and the term "or" is used to refer to a nonexclusive "or" unless otherwise indicated. In addition, it is to be understood that the phraseology or terminology employed herein, and not otherwise defined, is for the purpose of description only and not of limitation. For construing the scope of the term "about," the error bounds associated with the values (dimensions, operating conditions etc.) disclosed is ±10% of the values indicated in this disclosure. The word "substantially" used before a specific word includes the meanings "considerable in extent to that which is specified," and "largely but not wholly that which is specified."

DETAILED DISCLOSURE

Particular aspects of the invention are described below in considerable detail for the purpose for illustrating its principles and operation. However, various modifications may be made, and the scope of the invention is not limited to the exemplary aspects described.

A mobile application software or "app" is a computer program configured to run on a mobile device such as a smart phone, tablet or watch. An app comprises a front-end component or user interface ("UI") and is designed to provide the user with an easy-to-use and friendly interface. The front end communicates with a back-end component which facilitates data routing, security, authentication, authorization, working off-line, and service orchestration. An app may also communicate with one or more intermediate or middle components including, but not limited to, mobile app servers, message queuing, enterprise service bus ("ESB") and other service-oriented architecture ("SOA") infrastructure components. Data synchronization between the mobile device and a database or cloud and offline (without internet connection) capabilities are key to the seamless functioning of successful mobile apps. Providers of database and cloud services such as Couchbase Mobile (Couchbase), Azure Mobile Services (Microsoft), Cognito (Amazon), Firebase (Google) offer synchronization and offline capabilities with their mobile offerings. The app should preferably provide for secure data access communication with synchronized and decentralized storage, transmission and storage using features such as address authentication, data at rest, which relates to whether the app supports file system encryption and data-level encryption, data in motion, and read/write access that defines what data may be accessed and changed/modified by users. Databases may be relational (SQL databases such as Oracle, mySQL) or NoSQL (e.g. MongoDB, CouchDB). Further, for decentralized data writes on mobile platforms, the same data can be simultaneously modified on multiple devices and may create a conflict between data access from multiple devices. The app should preferably incorporate a mechanism for resolving those conflicts. The conflict resolution mechanism may allow resolution automatically, on the device, in the cloud, or could be manually initiated.

Disclosed is an app provided by an audit ready accounting service provider ("ARASP") that interfaces with an accounting software provided by an accounting service provider that include, but are not limited to, QuickBooks Online and Xero, via an application-programming interface ("API"). The API is a set of programming instructions and standards for accessing a Web-based software application or Web tool. For example, the QuickBooks Online API is a RESTful API that accesses QuickBooks Online using standard HTTP GET, PUT, POST, and DELETE methods and a simple JSON input and output format. The QuickBooks Online API performs a variety of accounting tasks including, but not limited to, manage customer and vendor databases, manage sales-side transactions (invoice, sales receipt, etc.) and purchase-side (bill, expense, etc.) transactions, retrieve QuickBooks Online reports, track sales and purchase taxes.

Figures 2A, 2B:

In an exemplary accounting method 100 provided by an ARASP (FIG. 1), the method comprises setting up a subscriber corporate profile account using an app in step 101. A corporate profile may comprise a corporate subscriber account and a predetermined number of user accounts associated with the subscriber account. Information required to set-up an account include company name and address identification (ID), number of authorized users associated with the subscriber, user ID, user login ID, user password and the like. A screenshot of the front-end (UI) of an exemplary accounting app is shown in FIG. 2A. Client profile information may be stored in database 160. The app is configured to receive user inputs, including but not limited to, entries related to bills and credit/debit card purchases, raise invoices, make bank deposits and the like. Oversight functionalities such as authorization by a line manager, and/or a corporate officer depending on the amount associated with the transactions and pursuant to a subscriber's authorization protocol may also be provided by the app. Further, a user may request assistance through the app from an accountant provided by the accounting service provider to manage transactional inputs.

FIG. 3A provides an exemplary list of data that may be required from a subscriber during onboarding (start-up) of a subscriber account. As can be seen, the subscriber entity may be a corporation, limited liability company, partnership and the like. For start-up companies, information related to founding members and a capitalization table may also be required from a subscriber. Authorize users associated with the subscriber may also be authorized to login to the app using their credential. Other information that may be needed, include, but is not limited to, tax related registration numbers, financial accounts information, payroll set-up information, names of shareholders, members, and partners if a subscriber is a corporation, limited liability company, or partnership respectively. Vendor and subcontractor information may also be input into the app during onboarding.

For each account profile, the app is configured to implement the steps of data capture and transfer, data processing, and generate processed data output. Transactional data may comprise expenses and payment data. Transactional data may be entered by at least one of the following steps, namely, (1) by an authorized user into the UI of the app and (2) may be e-mailed to a subscriber's e-mail account hosted by the ARASP or otherwise forwarded to the ARASP, for example, by mail. Sources for expense data may comprise at least one of invoices and itemized receipts generated by a variety of transactions related to corporate expenses of a subscriber account. Expense data may also be related to each authorized user of a subscriber and may include capital expenses made by the user and other non-capital expenses such as insurance charges related to medical, dental, disability, liability insurance and the like, legal and professional fees, office expenses, travel expenses, meals and entertainment and the like. Data may be provided in the following forms, that include, but is not limited to:

(a) invoices attached to e-mails related to corporate expenses (e.g. generated by vendors) and received into a subscriber corporate e-mail account (e.g. accounts-receivable@sub scriber-finbox.com);

(b) receipts related to authorized user expenses and received into a user e-mail account associated with a subscriber account (e.g. user@subscriber-finbox.com);

(c) expense information input by an authorized user into a user account associated with a corporate account through the app provided by an ARASP to each subscriber. The app may be configured to accept and process a copy of a receipt captured by the user using a camera found in a smart device.

(d) transactional information generated by each user associated with a subscriber and transmitted by at least one of credit/debit card magstripe readers (e.g. Square readers) and point of sale contactless readers (e.g. near field communication payment technology, Bluetooth payment technology, and the like) in the form of an e-mail to a user e-mail account (e.g. user@subscriber-finbox.com) or directly to a subscribers credit card account or bank account (e.g. checking account);

(e) Credit/debit card statements associated with each user credit card associated with a subscriber, and (f) Bank statements associated with each subscriber account.

(A) Entering Transactional Data Through the App

Figure 2C:

When transactional data is input by the user using the app, the method may include the following steps:

(a) entering transactional data related to credit card purchase receipts, invoices/bills and the like. FIGS. 2B and 2C;

(b) at least one of capturing a picture of an invoice or receipt and attaching a picture of the document that may be stored in the data file folder of the user's smart phone in step 102; (c) submitting the entered transactional data through the app using the "Submit" button. FIGS. 2B and 2C;

(d) assigning an accounting code to the submission;

(e) storing transactional data in subscriber's folder in database 160; and, (e) synchronizing subscriber's folder in database 160 with subscriber's information in ASP's database 170 via the API that provides a bidirectional communication and data transfer link between databases 160 and 170. The app places a note "entered by client via app" in the transaction and is reflected in the transaction found in the subscriber's ASP account.

Since the transactional data was entered by an authorized user, authorization or approval from the user's line manager or pursuant to a subscriber's approval standard operating procedure may not be required.

The user may contact an accountant retained by the accounting service provider in step 104 to provide assistance related to bookkeeping issues, answer questions related to categorizing expenses (e.g. whether an expense is a capital expense or an operational expense) and assist with data entry to ensure that all inputs are audit ready.

(B) Transactional Documents that Arrive into User's Dedicated e-Mail Account

Figure 2D:
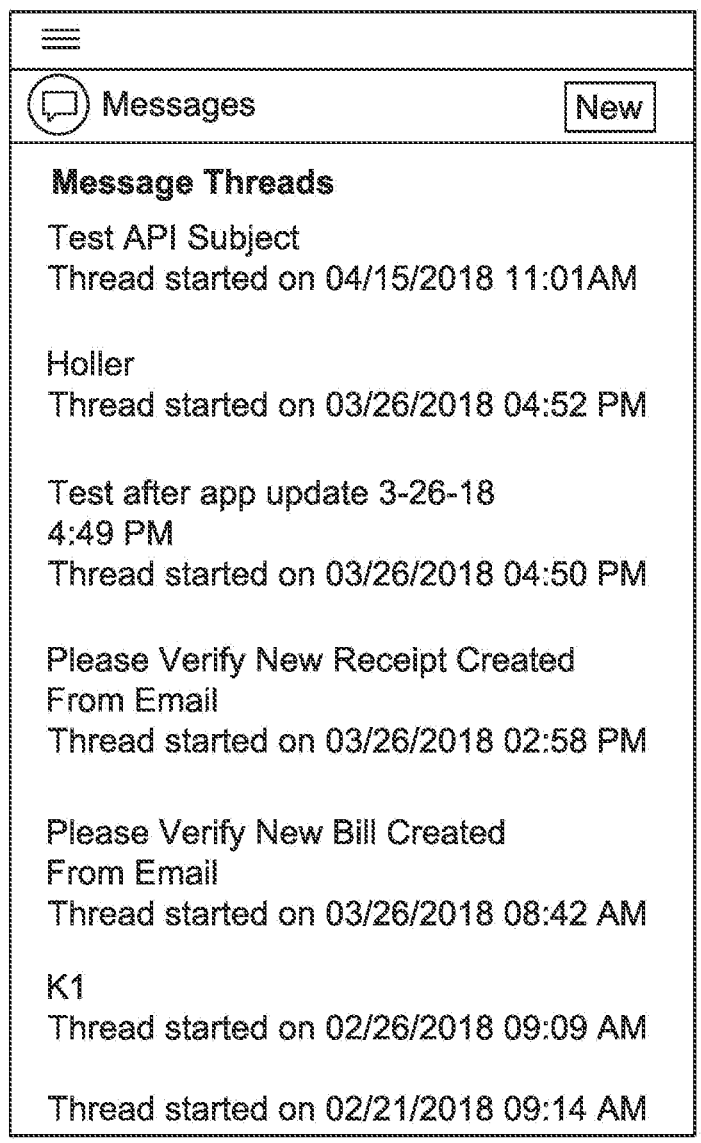

When transactional data is provided by vendors or service providers in the form of an e-mail, the method may include the following steps:

(a) setting-up an e-mail account for the subscriber hosted by the ARASP;

(b) Requesting vendors to forward e-mails of invoices and receipts to the subscriber's e-mail account in step 103. Alternately, a user may, instead of entering transactional data into the app, choose to e-mail a copy of invoices, receipts and the like to user's ARASP e-mail account;

(c) Entering transaction into subscriber's ASP account and attaching receipts to the transaction in step 109 by at least one of an accountant provided by the ARASP, a bookkeeper provided by ARASP, and the user;

(d) assigning an accounting code to the transaction;

(e) synchronizing subscriber's folder in database 160 with subscriber's information in ASP's database 170 via the API that provides a bidirectional communication and data transfer link between databases 160 and 170;

(f) sending a message comprising the transaction summary to the user via the app for approval in step 105 and using the messaging feature in the app, FIG. 2D; and (g) providing one of approval of the transaction via the messaging feature in the app (step 106), which is posted to the transaction in ASP database 170, and rejection of the transaction (step 107), in which case an amended transaction code is added to the transaction in step 108, which is then posted to the transaction in the subscriber's account in the ASP database 170.

Regarding entry of receipts (when payment already made with credit card or check) in step 109, the accountant or bookkeeper or user may enter transactional data into the ASP platform (e.g. QuickBooks) expense tab showing: account, vendor, amount, and then designates the source of payment (bank account or credit card). The person entering data may also attach a copy of e-mails and any supporting documents such as copies of receipts, bills, and subscriber invoices. The data entry person may then note in the memo field for the transaction "entered from email by x," where x is one of an accountant, bookkeeper, user.

For entry of invoices (payment not yet made with credit card or check) in step 109, the data entry person may enter transactional details into the ASP software bills tab showing: account, vendor, amount and then designates the source of payment, such as a subscriber's bank account. The data entry person may also attach a copy of e-mail and any supporting documents into the attachments field for the transaction. The data entry person may then note in the memo field for the transaction "entered from email by x," where x is one of an accountant, bookkeeper, user.

Transactional documents forwarded by subscriber to ARASP, for example, by mail or courier may be processed using the same procedure outlined in step (B).

Subscriber information in database 160 may be used to generate subscriber specific chart of accounts in step 110 and may be used, for example, by an accountant associated with the ARASP to inform and guide account coding decisions and to review and suggest potential changes for account coding based on coding review for any account numbers entered by client in step 102.

FIG. 3B provides an exemplary list of tasks that are conducted for each subscriber account on a daily basis. FIG. 3C provides an exemplary list of tasks that are conducted for each subscriber account on a monthly basis.

In the above examples, a user associated with a subscriber account is able to monitor account status (liquidity, liabilities etc.) on a substantially real-time basis. Further, some or about most of the tasks described in the above examples may be automated.

Databases (or servers) 160 and 170 are synchronized at periodic intervals. A plurality of subscriber accounts, with each account unique to a subscriber of the ARASP may be stored in databases 160 and 170. The disclosed methods facilitate creation of audit ready accounting transactions, which may comprise accounting coding information, documentation and client approval. The exemplary method described above provides for accounting and bookkeeping characterized by fast and accurate data entry, a streamlined process for greater efficiency, tracking of transactions and cash-flow across multiple documents, and reduces risk of human error and resulting financial issues and ensures that information is audit ready Any communication between client and the accountant may be recorded in the Messaging feature of the app. FIG. 2D. All communications between the user and the accountant are stored in the Messaging feature of the app.

The data transferred from the app to database 160 may include tags, or additional bits of information, related to the time, date and location from where the data was sent, and the nature of the transaction (e.g. a marketing expense to be categorized as entertainment). The app may be able to analyze the transaction for security risks and fraud, provide alerts (e.g. text messages) and take necessary action. The app may post a transaction to the client's ledger in substantially real time or at predetermined intervals, and add the transaction to the approved payables list, or place the transaction on a list of transactions in queue for secondary verification.

Security features may be built into the app. For example, techniques, protocols, and tools that enable the data to be encrypted, to enable the system to verify that the device used to transmit the data is actually owned by the user, to ping a user's device (e.g. text message, push authentication and the like) to check if the user's device is ready to receive data or reports sent from the server to the user's device may be used. Alphanumeric password protection may also be used. Alternately, the app on the user's device may be capable of verifying and allowing any communication from database 160.

The first and second applications may communicate via Transport Layer Security ("TLS") protocols for secure exchange of data over a network and to preserve data integrity. TLS (e.g. TLS 1.2) ensures that a connection to a targeted endpoint is the intended endpoint through encryption and endpoint identity verification.

Subscriber data provided by accounting module 100 and stored in ARASP database 160 may be utilized by the subscriber for value added data analysis and planning in addition to audit ready accounting. In an exemplary method 400, information from other databases 180 may be aggregated into a master database 190 (FIG. 4). An example of database 180 is a subscriber's sales management database, for example, subscriber's CRM ("customer relationship management") tools that include, but are not limited to, Salesforce, Pipedrive, Freshsales, Insightly, and Zoho databases. A sales database allows a customer to maintain in substantially real-time customer lists, monitor its sales pipeline, current sales and sales targets, contacts, customer communications, priortize and focus sales and business development activities, and develop and implement subscriber's sales strategy taking into account subscriber's cash flow forecasts. Another example of database 180 is a subscriber's patent portfolio management database, which may be provided as a docket by subscriber's external patent counsel, to manage and grow subscriber's patent strategy, and to align patent filing, prosecution and maintenance costs with patent monetization startegies via product sales, enforcement, licensing, acquistions and the like. Outputs of tools such as Thomson Innovation, Anaqua, PatSnap that provide competetive analysis of a subscriber's patent portfolio may also be aggregated to examine subscriber's SWOT (strength, weakness, opportunties, and threats) within subscriber's competive space, and to indentify "white space" for subscriber's R&D team to exploit, and development of next generation innovtaive concepts, products, and offerings.

Data exchange and communication between the plurality of databases 180 and master database 190 is managed through the app via for example, an API associated with databases 180. For example, the app may communicate with a Salesforce database via REST and SOAP based APIs. The app may also be configured to pull commercial data, analytics and other corporate information from subscriber's account at service providers such as Dun & Bradstreet, Inc.

Information stored in database 190 may be used by the app to generate indicators related to subscriber's current profitability and predict future profitability. The app is configured to perform data mining of data stored in database 190. Data mining may be generally defined as "the practice of examining large databases in order to generate new information." Data mining may be used by subscribers to look for patterns in large batches of data that may be used to improve their corporate internal management processes, develop more effective marketing strategies, implement product development roadmaps that align with marketing strategies, and achieve sustained revenue growth as well as increased sales and cost reduction. The app may utilize a plurality of knowledge-based editors or learning algorithms (191 and 192) to predict and optimize outputs (193 and 194) such as product development roadmaps, innovation roadmaps, cost control options, revenue forecasts, sales forecasts, sales strategy, pricing strategy, project execution, general accounting compliance, general accounting fraud assessment, tax strategies, fiduciary obligation of stakeholders and officers and other best practices to examine current profitability and predict future profitability of a subscriber. Machine learning algorithms for predictive analysis include, but are not limited to, linear regression, logistic regression (go-to methods), linear discriminant analysis, classification and regression trees (decision trees), Naïve Bayes, K-Nearest Neighbors, and Learning Vector Quantization. The app may utilize rules-based algorithms that examine a plurality of subscriber transactions and data in database 190 at predetermined intervals using environmental sensors (or indicators) that include, but are not limited to, (a) financial indicators (e.g., market volatility, debt ratios, profitability, financial leverage, and the like); (b) market indicators (e.g. total available market, market penetration potential, customer pain points, repeat business percentage, ability to add new customers, and the like); (c) technology readiness in a product development roadmap, SWOT analysis, and the like; (d) customer response to questionnaires, customer behavior studies, market disruptions, change in customer preferences, and the like. Learning algorithms may utilize fully and partially observable data, deterministic and stochastic data, discrete and continuous data, benign and adversarial environmental data, and the like to output recommendations (e.g. future profitability) that is statistically reliable.

Data inputs (input variables) to these learning algorithms may comprise data mined from database 190. As shown in FIG. 5A, exemplary environmental and internal indicators 501 may be processed by the app to extract a set of exemplary indicators 502, which may be further processed to identify exemplary decision points 503 that may comprise a subscriber's market attractiveness and competitive position, which may be then used to estimated performance indicators such as current profitability of a subscriber (output variables). Since change is inevitable, the app may be used to help a subscriber predict changes and adapt to changes, and to maintain its continued future profitability. As shown in FIG. 5B, current profitability and other performance indicators 504 may be used to forecast indicators 505, which may then be manipulated to yield summary indicators 506 that may be used to forecast subscriber's future profitability. Learning routines may also be applied using accounting data stored in database 160 to predict accounting codes in step 111 that may be fed into step 109.

Although methods 100 and 400 describe storing input and output data in a plurality of databases, the functionalities of the databases may be combined into a single master database such as database 190. Further, the app may be modified to process the accounting functions of the software provided by the ASP (e.g. QuickBooks), thereby eliminating the need to link with an ASP software via an API.

The features and capabilities of databases 160 and 170 may be integrated into a single database (or server). In this aspect, the ARASP software may incorporate the features and capabilities of the ASP software that are required for basic accounting services, in particular, for start-up companies and SMEs. Exemplary systems and methods described may provide for sequencing a plurality of bookkeeping events 600 (FIG. 6) at periodic intervals, (e.g. once a month). Step 601 provides for enrolling a new user and/or subscriber. A subscriber may be able to select from a suite of services in addition to basic accounting services. For example, a subscriber may add-on one or more of services ("special needs"), which include, but are not limited to:

(a) M&A and investment services that provides for keeping track of the user's capitalization table, convertible loans and other investment related functions;

(b) Intellectual property assets and expense management and categorization;

(c) Stock option plans;

(d) Asset purchases and depreciation schedule;

(e) Employee hiring and termination, and (f) Communication with the user's bank account.

A subscriber may also be able to upload (or migrate) its existing chart of accounts after creating a new account. Step 602 allows a subscriber to add customers, vendors, select the modes by which the subscriber wishes to make or receive payments (e.g. cash, check, wire transfer, ACH etc.). Pre-qualified vendors and customers may be able to receive or make payments directly from/to the subscriber's account if they are provided access to do so by the subscriber. The system may provide periodic reminders to the subscribers related to tax payments and the like. At periodic intervals, the subscriber's financial information stored in the subscriber's account may be reconciled with the subscriber's bank account.

Subscriber accounts may be renewable at predetermined intervals. The intervals may include once a month once a year, once in two years and the like. Security features may be built into the accounting software. For example, techniques, protocols, and tools that enable subscriber data to be encrypted, to enable the system to verify that the hardware and interface used to transmit the data is actually owned by the subscriber, to ping a user's device (e.g. text message) to check if the user's device is ready to receive data or reports sent from the server to the user's device. Alternately, the "app" on the user's device may be capable of verifying and allowing any communication from the server. The data transferred from an authorized device to the server may include tags, or additional bits of information, related to the time, date and location from where the data was sent from, and the nature of the transaction (e.g. a marketing expense to be categorized as entertainment). The accounting software may be able to analyze the transaction for security risks and fraud, provide alerts (e.g. text messages) and take necessary action. The accounting software may post a transaction to the client's ledger in real time or at predetermined intervals, and add the transaction to the approved payables list, or place the transaction on a list of transactions subject to a secondary verification. Methods of performing a secondary verification include sending an SMS message or a message through the app to a user (or to another member of a subscriber's team) and requesting the user to take some specific action that will provide secondary validation.

Before an invoice is paid either electronically or by check, the server may communicate with the user's bank account and verify that there are sufficient funds in the user's account to enable the transaction. If there are insufficient funds, the server may first notify the subscriber. A human bookkeeper provided by the ASP may assist the user (or the accounting software) with executing or verifying transactions. For example, if there are insufficient funds in a subscriber account to pay a bill, or the subscriber has sufficient funds but has requested a payment that exceeds predetermined limits, a human bookkeeper may contact the user to discuss the transaction.

At regular intervals, an approved payable list may be sent to a user's bank for electronic payment of each A/P pending. Payments that are not able to be completed electronically may be routed to a paper check operation center. Paper checks may be prepared and mailed manually, or an automated check printing machine may be utilized, or a hybrid process may be utilized whereby some of the steps are automated. If a subscriber wishes to terminate its account (step 603) the exemplary system may provide a copy of requested documentation or summary reports to the subscriber and terminates the account. The information related to a user account may be archived for a pre-determined time, or as required by law.

Synchronizing (reconciling) the subscriber's account with its relevant business bank accounts may not always work because expenses and or payments may be misallocated and not treated appropriately for tax purposes. In an exemplary aspect, data input, processing and reporting may be automated. An automated accounting system may receive user input (receipts, invoices, payments etc.), match payment received with invoices, process received input into appropriate categories with minimal or no user intervention, manage accounts, and output reports such as P&L statement, balance sheet, A/P summary, and A/R summary as needed. Further, a subscriber's "special needs" as described above may be integrated with accounting services. While using the app as the user interface may be preferred, the interface between may be a website or web portal provided by an ARASP and accessible using a user device.

The Abstract is provided to comply with 37 C.F.R. § 1.72(b), to allow the reader to determine quickly from a cursory inspection the nature and gist of the technical disclosure. It should not be used to interpret or limit the scope or meaning of the claims.

Although the present disclosure has been described in connection with the preferred form of practicing it, those of ordinary skill in the art will understand that many modifications can be made thereto without departing from the spirit of the present disclosure. Accordingly, it is not intended that the scope of the disclosure in any way be limited by the above description.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that the words for each element may be expressed by equivalent apparatus terms or method terms~even if only the function or result is the same. Such equivalent, broader, or even more generic terms should be considered to be encompassed in the description of each element or action. Such terms can be substituted where desired to make explicit the implicitly broad coverage to which this disclosure is entitled. It should be understood that all actions may be expressed as a means for taking that action or as an element which causes that action. Similarly, each physical element disclosed should be understood to encompass a disclosure of the action which that physical element facilitates.

In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Further, the use of the transitional phrase "comprising" is used to maintain the "open-end" claims herein, according to traditional claim interpretation. Thus, unless the context requires otherwise, it should be understood that variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible.

What is claimed is:

1. A method for providing accounting services by an accounting service provider to a subscriber, the method comprising:
   providing a first accounting application software configured to communicate with a first database for storing transactional data;
   providing a second accounting application software configured to communicate with a second database for storing transactional data and wherein the first and second databases communicate with each other through an API provided by the first software;
   setting up a subscriber corporate profile account using the first accounting software and the second accounting software, wherein the corporate account comprises a plurality of authorized user accounts;
   inputting transactional data to at least one of a user account and corporate account using at least one of the first accounting software and second accounting software after assigning an accounting code related to each transactional data;
   processing data using at least one of monthly processing and daily processing steps;
   generating requests for authorization related to at least one of an authorized user transaction and corporate transaction using the first accounting software wherein requests authorized by a supervisor are added to the second database and requests not authorized are routed back for corrective coding; and,
   outputting audit-ready financial reports comprising at least one of P&L statement, balance sheet, cash flow statements, A/P summary, and A/R summary.

2. The method of claim 1 further comprising the step of generating subscriber specific chart of accounts by the first accounting software.

3. The method of claim 2 wherein the subscriber specific chart of accounts is used to guide corrective accounting coding for each transactional data.

4. The method of claim 1 further comprising the step of synchronizing the first and second databases at predetermined intervals using an API provided by the first software for bidirectional secure communication between the databases.

5. The method of claim 1 wherein the requests for authorization are sent in the form of a message generated by the first software to the supervisor.

6. The method of claim 1 wherein the first software comprises a mobile application program configured to run on a smart device assigned to a user.

7. The method of claim 6 wherein user access to the first software using a smart device is secured by an alphanumeric passcode.

8. The method of claim 6 wherein user access to the first software using a smart device is secured by push authentication.

9. The method of claim 1 wherein the first and second application software communicate securely using TLS protocol.

10. The method of claim 1 wherein the second accounting software is a commercially available accounting software.

11. The method of claim 1 wherein the inputting transactional data step comprises at least one of inputting:
   a. invoices attached to e-mails related to corporate expenses and received into a subscriber corporate e-mail account;
   b. receipts related to user expenses and received into a user e-mail account associated with a subscriber account;
   c. expense information captured by a user using a camera of a smart device to provide a digitized source document;
   d. transactional information generated by each user associated with a subscriber and transmitted by at least one of credit/debit card magstripe readers and point of sale contactless readers in the form of at least one of an e-mail directed to a user e-mail account and directly to a subscriber's credit card account or bank account;
   e. credit/debit card statements associated with each user credit card associated with a subscriber; and,
   f. bank statements associated with each subscriber account.

12. The method of claim 1 wherein the inputting step comprises inputting transactional data received by a bookkeeper retained by the service provider into the second software.

13. The method of claim 1 wherein the inputting step comprises inputting transactional data received by an accountant retained by the service provider into the second software.

14. The method of claim 1 wherein the inputting step comprises inputting transactional data received in the form a digitized source document by a user into the first software.

15. The method of claim 1 wherein the inputting step comprises assigning an accounting code comprising at least one of the time, date, location from where the data was sent, and the type of transaction corresponding to the digitized source document.

16. The method of claim 15 further comprising using machine learning algorithms to predict an accounting code.

17. The method of claim 1 wherein the inputting step comprises inputting data received in the form at least one of a digitized source document and e-mails by machine learning algorithms incorporated in the first software.

18. The method of claim 1 wherein the monthly processing step comprises at least one of:
   a. reconciling subscriber bank account and producing a bank account reconciliation report;
   b. reconciling subscriber credit card account and producing credit card account reconciliation report;
   c. synchronizing first and second databases;
   d. preparing monthly reports comprising at least of P&L statement, balance sheet, and cash flow statements;
   e. messaging subscriber that reports are completed and providing a link to said reports; and,
   f. preparing monthly tax payment statements.

19. The method of claim 1 wherein the daily processing step comprises at least one of:
   a. uploading online transactions from at least one of subscriber's bank account and credit card account;
   b. entering invoices from e-mails;
   c. reviewing any transactions input using the first software and adding any exceptions in a report to the supervisor;
   d. matching at least one of bank account and credit card account transactions with the subscriber information in the second database;
   e. recoding account number for invoiced expenses received from at least one of subscriber bank account and credit card account;
   f. sending at least one of bank account and credit card account reports to a supervisor;
   g. entering customer payments received;
   h. preparing and distributing any invoices; and,
   i. conducting supervisor tasks comprising at least one of:
      i. responding to any messenger requests;
      ii. sending messages to subscriber requesting documentation for one or more transactions identified in supervisor reports;
      iii. approving reimbursements;
      iv. sending approval messages for outgoing payments; and,
      v. paying any invoices and credit card bills due.

20. The method of claim 1 wherein the first database comprises at least one of a relational database and a NoSQL database.

21. The method of claim 1 further comprising the step of analyzing transactional data for fraud.

22. The method of claim 1 further comprising a master database for aggregating data from first and second databases and third-party databases.

23. The method of claim 22 wherein the third-party database comprises at least one of subscriber's sales management database, patent portfolio management database, and corporate information service providers database.

24. The method of claim 22 further comprising the step of datamining the aggregated data to identify patterns related to at least one of subscriber's revenue growth, revenue targets, marketing strategies, internal management processes, and cost profiles.

25. The method of claim 24 further comprising utilizing machine learning algorithms to predict and optimize at least one of subscriber's product development roadmaps, innovation roadmaps, cost control options, revenue forecasts, sales forecasts, sales strategy, pricing strategy, project execution, general accounting compliance, general accounting fraud assessment, tax strategies, and fiduciary obligation of stakeholders and officers.

26. The method of claim 25 wherein the machine learning algorithms use at least one of linear regression, logistic regression (go-to methods), linear discriminant analysis, classification and regression trees (decision trees), Naïve Bayes, K-Nearest Neighbors, and Learning Vector Quantization.

27. The method of claim 25 wherein the data input to the learning algorithms comprises data mined from the aggregated data.

28. A system for providing accounting service by an accounting service provider to a subscriber, the system comprising:
   a mobile device configured to run a first accounting software configured to receive transactional data related to a subscriber corporate account comprising a plurality of authorized user accounts wherein:
   a first database for storing transactional data and configured to communicate with the first accounting software; and,
   a second database for storing transactional data and configured to communicate with a second accounting software wherein the first and second databases communicate with each other through an API provided by the first software and wherein:
      the second accounting software is configured to process transactional data using at least one of monthly processing and daily processing steps;
      the first and second databases are synchronized at predetermined intervals using the API; and,
      the first accounting software is configured to output audit-ready financial reports comprising at least one of P&L statement, balance sheet, cash flow statement, A/P summary, and A/R summary.

29. The system of claim 28 wherein the first database is at least one of a relational database and a NoSQL database.

30. The system of claim 28 wherein the second database is at least one of a relational database and a NoSQL database.

31. The system of claim 28 wherein transactional data is input in part by a bookkeeper retained by the service provider.

32. The system of claim 28 wherein transactional data is input in part by a user using the mobile device.

33. The system of claim 28 wherein transactional data in the form a digitized source document is input in part by a user into the first accounting software.

34. The system of claim 28 further comprising a camera in the mobile device to capture transactional data in the form of digitized source document.

35. A system for providing accounting service by an accounting service provider to a subscriber, the system comprising:
   a user device configured to access a web server provided by the service provider and run a first accounting software configured to receive transactional data related to a subscriber corporate account comprising a plurality of authorized user accounts wherein:
   a first database for storing transactional data and configured to communicate with the first accounting software; and,
   a second database for storing transactional data and configured to communicate with a second accounting software wherein the first and second databases communicate with each other through an API provided by the first software and wherein:
      the second accounting software is configured to process transactional data using at least one of monthly processing and daily processing steps;
      the first and second databases are synchronized at predetermined intervals using the API; and,
      the first accounting software is configured to output audit-ready financial reports comprising at least one of P&L statement, balance sheet, cash flow statement, A/P summary, and A/R summary.

* * * * *